(12) United States Patent
Yoso et al.

(10) Patent No.: US 8,804,084 B2
(45) Date of Patent: Aug. 12, 2014

(54) LIQUID CRYSTAL DISPLAY PANEL

(75) Inventors: Aya Yoso, Tottori (JP); Joji Nishimura, Nagano (JP); Hayato Kurasawa, Kanagawa (JP)

(73) Assignee: Japan Display West Inc., Chita-gun, Aichi-ken (JP)

( * ) Notice: Subject to any disclaimer, the term of this patent is extended or adjusted under 35 U.S.C. 154(b) by 236 days.

(21) Appl. No.: 12/976,365

(22) Filed: Dec. 22, 2010

(65) Prior Publication Data

US 2012/0162589 A1    Jun. 28, 2012

(51) Int. Cl.
*G02F 1/1343* (2006.01)
*G02F 1/1337* (2006.01)

(52) U.S. Cl.
USPC .............................. 349/144; 349/129; 349/141

(58) Field of Classification Search
USPC .......................... 349/129, 139–144
See application file for complete search history.

(56) References Cited

U.S. PATENT DOCUMENTS 8,259,269 B2 *  9/2012  Itou et al. ............ 349/129

FOREIGN PATENT DOCUMENTS

| JP | 2005-107535 | 4/2005 |
| JP | 2005-196118 | 7/2005 |
| JP | 2007-034151 | 2/2007 |
| JP | 2009-145366 | 7/2009 |

* cited by examiner

*Primary Examiner* — Dung Nguyen
(74) *Attorney, Agent, or Firm* — K&L Gates LLP

(57) ABSTRACT

A liquid crystal display panel is provides and includes a pair of substrates arranged face to face so as to sandwich a liquid crystal layer. The liquid crystal device includes on one of the pair of substrates: a lower electrode; an upper electrode formed on a surface of the lower substrate through an insulating layer, in which plural slits are formed in each sub-pixel; and an alignment film formed so as to cover a surface of the upper electrode and the insulating layer. The plural slits have different widths at both ends of slits in a longitudinal direction.

10 Claims, 5 Drawing Sheets

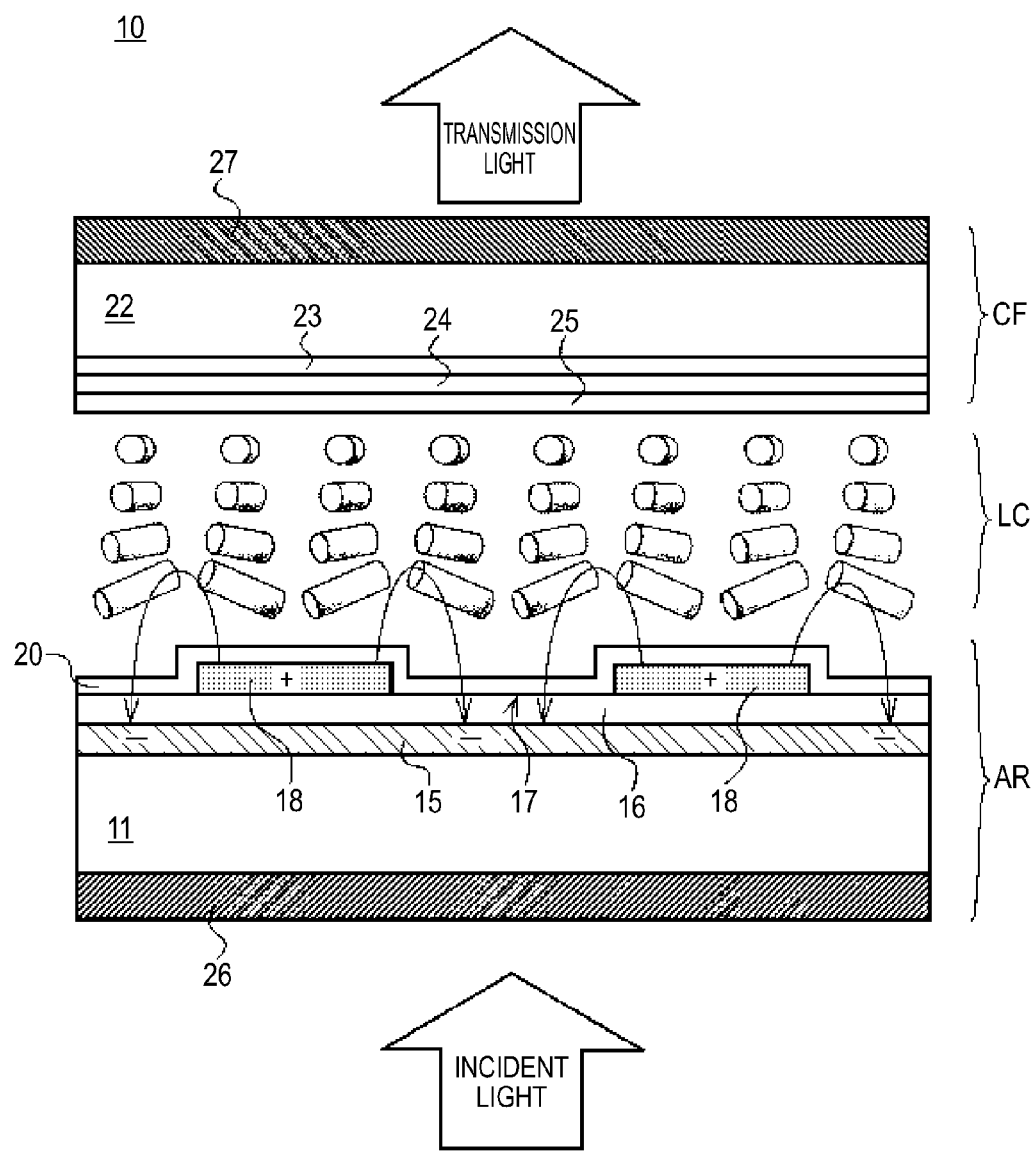

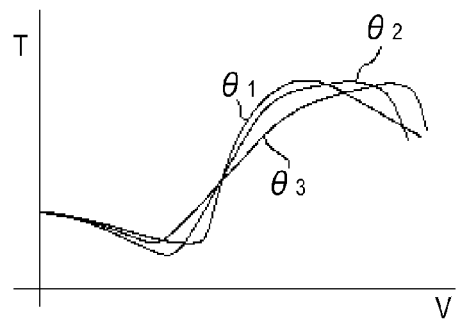
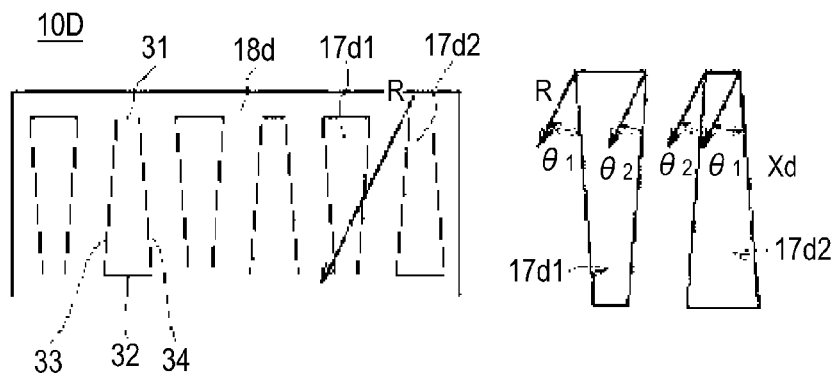
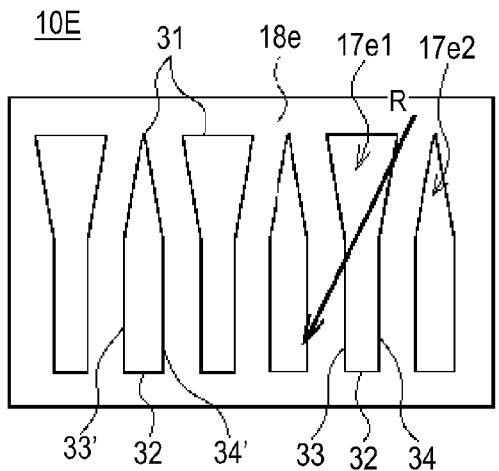

LIQUID CRYSTAL DISPLAY PANEL

BACKGROUND

The present disclosure relates to a horizontal-electric field liquid crystal display panel. More specifically, the invention relates to a Fringe-Field-Switching (referred to as "FFS" in the following description)-mode liquid crystal display panel with good viewing-angle characteristics and with less coloring.

As the liquid crystal display is characterized in that it is light in weight, thin, and has low power consumption as compared with a CRT (cathode ray tube), it is used for many electronic apparatus for display. The liquid crystal display panel changes orientation of liquid crystal molecules by an electric field, which are aligned in a given direction by performing rubbing processing to an alignment film, and changes the transmission amount or the reflection amount of light to display images.

As methods for applying an electric field on a liquid crystal layer of the liquid crystal display panel, there are a vertical-electric field type and a horizontal-electric field type. In a vertical-electric field liquid crystal display panel, an electric field of a nearly vertical direction is applied to liquid crystal molecules by a pair of electrodes arranged so as to sandwich the liquid crystal layer. As the vertical-electric field liquid crystal display panels, a TN (Twisted Nematic) mode, a VA (Vertical Alignment) mode, a MVA (Multi-domain Vertical Alignment) mode and the like are known. In a horizontal-electric field liquid crystal display panel, a pair of electrodes are provided so as to be insulated from each other on an inner surface of one of a pair of substrates arranged to sandwich the liquid crystal layer and an electric field of a nearly horizontal direction is applied to liquid crystal molecules. As the horizontal-electric field liquid crystal display panels, an IPS (In-Plane Switching) mode in which the pair of electrodes do not overlap in plan view and an FFS (Fringe Field Switching) mode in which the pair of electrodes overlap are known.

Among the above modes, in the FFS-mode liquid crystal display panel, a pair of electrodes including an upper electrode and a lower electrode are arranged at different layers respectively through an insulating film, slit-shaped openings are provided at the upper electrode and the electric field in the nearly horizontal direction passing through the slits is applied to the liquid crystal layer. The FFS-mode liquid crystal display panel is widely used in recent years because it has advantages such that wide viewing angle can be obtained as well as image contrast can be improved. However, a slit having a fixed width is used in each sub-pixel in the horizontal-electric field liquid crystal display panel, therefore, there are a problem that coloring occurs depending on a viewing angle direction due to VT characteristics in respective sub-pixels. In order to improve the viewing angle characteristics and to reduce the coloring in the horizontal-electric field liquid crystal display panel, attempts to divide a rubbing direction into plural directions in one pixel have been made (refer to JP-A-2005-196118 (Patent Document 1)). Here, the liquid crystal display panel disclosed in Patent Document 1 will be explained in reference to FIG. 10.

FIG. 10 is a schematic plan view of one sub-pixel of the horizontal-electric field liquid crystal display panel disclosed in JP-A-2005-196118 (Patent Document 1).

In a horizontal-electric field liquid crystal display 50, one sub-pixel is divided into four domains of IA, IIA, IIIB, and IVB, and angles made by common electrodes 51a, 51b as well as pixel electrodes 52a, 52b driven by a TFT and rubbing directions are changed in respective domains. In the liquid crystal display panel 50, the four domains are formed by arranging the common electrodes 51a, 51b and the pixel electrodes 52a, 52b so as to be folded in the horizontal direction and the vertical direction respectively, the rubbing direction is changed in a region A and a region B of one sub-pixel, and further, color conversion is compensated with one another in respective domains to reduce the coloring.

SUMMARY

According to the above liquid crystal display panel 50 in related art, the improvement of viewing angel characteristics and the reduction of the coloring can be expected after a sort. However, in the case of the above liquid crystal display panel 50, there is technical difficulty that it is necessary to divide the rubbing direction into plural directions within a narrow region of one sub-pixel. Moreover, as four multi-domains are formed by slits having a fixed width in the above liquid crystal display panel 50, four regions are generated in one sub-pixel, which causes a problem that it is difficult to obtain good display characteristics due to disclination.

Thus, it is desirable to provide an FFS-mode liquid crystal display panel with good viewing angle characteristics and with less coloring.

According to an embodiment, there is provided a liquid crystal display panel having a pair of substrates arranged face to face so as to sandwich a liquid crystal layer including a lower electrode, an upper electrode formed on a surface of the lower substrate through an insulating layer, in which plural slits are formed in each sub-pixel and an alignment film formed so as to cover a surface of the upper electrode and the insulating layer on one of the pair of substrates, in which the plural slits have different widths at both ends of slits in a longitudinal direction.

The liquid crystal display panel according to the embodiment has a pair of substrates arranged face to face so as to sandwich the liquid crystal layer and includes the lower electrode, the upper electrode formed on the surface of the lower substrate through the insulating layer, in which plural slits are formed in each sub-pixel and the alignment film formed so as to cover the surface of the upper electrode and the insulating layer on one of the pair of substrates. The liquid crystal display panel according to the embodiment operates in an FFS mode by the above structure. In the liquid crystal display panel of the embodiment, the lower electrode may be formed on a surface of an interlayer film made of a resin film or may be formed on a surface of a transparent substrate such as a glass substrate. As the insulating film formed on the surface of the lower electrode, an inorganic insulating film such as silicon dioxide or silicon nitride is used, and preferably silicon nitride is used from a viewpoint of insulation performance. As the upper electrode and the lower electrode, a transparent conductive material such as ITO (Indium Tin Oxide) or IZO (Indium Zinc Oxide) can be used.

The light transmittance of the liquid crystal display panel varies according to variation of drive voltage applied to the liquid crystal layer. The characteristics are called voltage transmittance (VT) characteristics. The variation of the light transmittance due to variation of the drive voltage differs according to a light wavelength, therefore, a phenomenon called coloring occurs. In the case of the FFS-mode liquid crystal display, the relation between the voltage applied to the liquid crystal layer and light transmittance of the liquid crystal layer, namely, the VT characteristics vary according to angles made by the slits of the upper electrode in the longitudinal direction which cross the rubbing direction and the rubbing direction.

The liquid crystal display panel according to the embodiment has the structure in which plural slits have different widths at both ends of slits in the longitudinal direction. When such structure is applied, the angles made by edges of both sides of each slit along the longitudinal direction and the rubbing direction vary. Moreover, the widths of the slit and an electrode portion between the slits sequentially vary along the longitudinal direction, therefore, the VT characteristics are shifted at portions of respective widths, as a result, different plural VT characteristics can be obtained in each slit. When plural VT characteristics are included in each slit, the plural VT characteristics are superimposed and VT characteristics represented by an envelope thereof can be obtained. Accordingly, the VT characteristics in a wide range are included in the liquid crystal display panel according to the embodiment, therefore, the liquid crystal display panel in which viewing-angle characteristics become good as well as coloring hardly occurs can be obtained. The pixel having plural slit widths can be obtained according to the structure, therefore, plural VT characteristics can be obtained.

In the liquid crystal display panel of the embodiment, it is preferable that each of the plural slits has a slit opening in which both ends thereof in the longitudinal direction are closed.

As both ends of the plural slit opening in the longitudinal direction are closed in the liquid crystal display panel according to the embodiment, the shape of the end of the slit can be formed precisely, therefore, reverse twisted domain hardly occurs and the high-quality liquid crystal display panel can be provided.

In the liquid crystal display panel of the embodiment, it is preferable that edges of the slit along the longitudinal direction are formed to be asymmetrical with respect to an axis corresponding to the longitudinal direction of the slit.

When the edges of the slit along the longitudinal direction are asymmetrical with respect to the axis corresponding to the longitudinal direction of the slit, angles made by edges of both sides of each slit along the longitudinal direction and the rubbing direction differ. Additionally, the angles made by edges of both edges of each slit along the longitudinal direction and the rubbing direction can be set to optional plural values, therefore, plural VT characteristics fixed by these angles can be optionally set. Accordingly, the liquid crystal display panel in which viewing-angle characteristics become good as well as the coloring further hardly occurs can be obtained according to the embodiment.

In the liquid crystal display panel of the embodiment, it is preferable that the slit has a folding portion at which edges of the slit along the longitudinal direction of the slit are folded in a direction in which the edges are apart from each other.

When the slit has the folding portion at which the edges of the slit along the longitudinal direction of the slit are folded in the direction in which the edges are apart from each other, angles made by edges at both sides of each slit in the longitudinal direction and the rubbing direction will be at least three kinds Accordingly, at least three kinds of VT characteristics are obtained in each slit in the liquid crystal display panel according to the embodiment, therefore, the liquid crystal display panel in which viewing-angle characteristics become good as well as the coloring further hardly occurs can be obtained according to the embodiment.

In the liquid crystal display panel of the embodiment, it is preferable that plural pairs of slits are included, in which slits in each pair have different shapes respectively.

Each pair of slits having different shapes has at least two kinds of VT characteristics in each pair of slits which are different according to the shape of respective slits. Therefore, the liquid crystal display panel in which viewing-angle characteristics become good as well as the coloring hardly occurs can be obtained according to the embodiment. As more slits can be arranged, the transmittance is improved.

In the liquid crystal display panel of the embodiment, it is preferable that the slits in each pair having the same shape are arranged to be inverted with respect to each other at a central axis in the direction orthogonal to the longitudinal direction of the slits.

When slits in each pair having the same shape are arranged to be inverted with respect to each other at a central axis in the direction orthogonal to the longitudinal direction of the slits, many pairs of slits having different shapes from each other can be arranged symmetrically with respect to the axis within one sub-pixel. When applying such structure, at least two kinds of VT characteristics are obtained in each pair of slits as well as many slits can be arranged in one sub-pixel, in addition, a light emitting state of liquid crystal will be symmetrical with respect to the central axis in the direction orthogonal to the longitudinal direction of the slits. Accordingly, the liquid crystal display panel in which viewing-angle characteristics become good, an aperture ratio is high, display quality is good, and further, the coloring hardly occurs can be obtained according to the embodiment.

In the liquid crystal display panel of the embodiment, it is preferable that the slits in each pair having different shapes are arranged to be inverted with respect to each other at a central axis in the direction orthogonal to the longitudinal direction of the slits.

When slits in each pair having different shapes are arranged to be inverted with respect to each other at a central axis in the direction orthogonal to the longitudinal direction of the slits, many pairs of slits having different shapes from each other can be arranged symmetrically with respect to the axis within one sub-pixel. When applying such structure, at least three kinds of VT characteristics are obtained in each pair of slits as well as many slits can be arranged in one sub-pixel, in addition, the light emitting state of liquid crystal will be symmetrical with respect to the central axis in the direction orthogonal to the longitudinal direction of the slits. For example, in the case that respective edges forming one slit are not formed to be parallel to each other, four kinds of VT characteristics can be obtained. Accordingly, the liquid crystal display panel in which viewing-angle characteristics become good, display quality is good as well as the coloring hardly occurs can be obtained according to the embodiment.

In the liquid crystal display panel of the embodiment, it is preferable that the slits in each pair are formed so that edges of adjacent slits along the longitudinal direction are parallel to each other.

When the edges of adjacent slits along the longitudinal direction are formed to be parallel to each other, slits in each pair have shapes complementary to each other. When applying such structure, slits which are asymmetrical to each other with respect to the central axis in the direction orthogonal to the longitudinal direction of the slits, and at least two to four kinds of VT characteristics are obtained in each pair of slits as well as many pair of slits in which slits in each pair have different shapes are efficiently arranged in one sub-pixel. Accordingly, in the liquid crystal display in which viewing-angle characteristics become good, transmittance is high as well as the coloring hardly occurs can be obtained according to the embodiment.

In the liquid crystal display panel of the embodiment, it is preferable that a rubbing direction of the alignment layer is a direction crossing all edges corresponding to the longitudinal direction of the slits.

According to the liquid crystal display having the embodiment, fringe field effect can be exerted in all edges corresponding to the longitudinal direction of the slits, therefore, advantages can be achieved more noticeably.

Additional features and advantages are described herein, and will be apparent from the following Detailed Description and the figures.

BRIEF DESCRIPTION OF THE FIGURES

FIG. 1 is a schematic cross-sectional view for explaining the operation principle of a liquid crystal display according to an embodiment;

FIG. 6 is a graph showing VT curves of long edges of the slit according to the third embodiment;

FIG. 7A is a plan view of an upper electrode of one pixel according to a fourth embodiment and FIG. 7B is an enlarged view for explaining angles made by a pair of slits and the rubbing direction of FIG. 7A;

FIG. 8A is a plan view of an upper electrode of one pixel according to a fifth embodiment and FIG. 8B is an enlarged view for explaining angles made by a pair of slits and the rubbing direction of FIG. 8A;

DETAILED DESCRIPTION

Hereinafter, embodiments will be explained with reference to the drawings. In respective drawings used for explanation in the specification, respective layers and respective members are displayed with different scale ratios in order to allow respective layers and respective members to be sizes recognizable on the drawings, therefore, they are not displayed with the size corresponding to actual sizes.

Figure 2A:
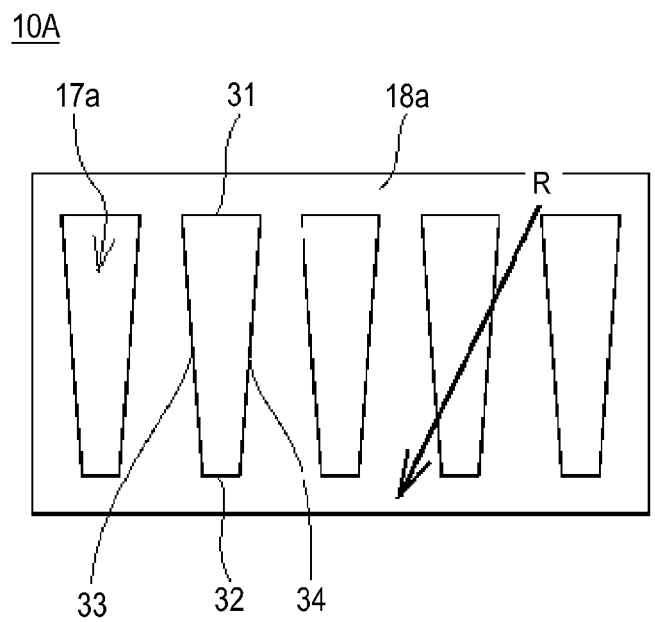
FIG. 2A is a plan view of an upper electrode of one pixel according to a first embodiment and FIG. 2B is an enlarged view for explaining angles made by one slit and a rubbing direction of FIG. 2A.
Figure 2B:
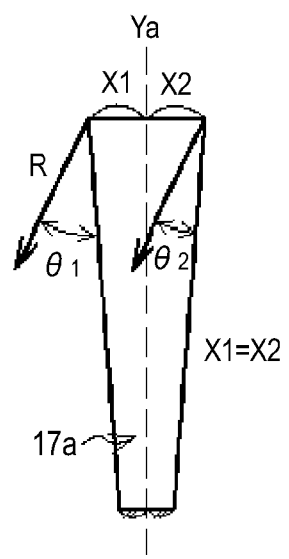
Figure 3:
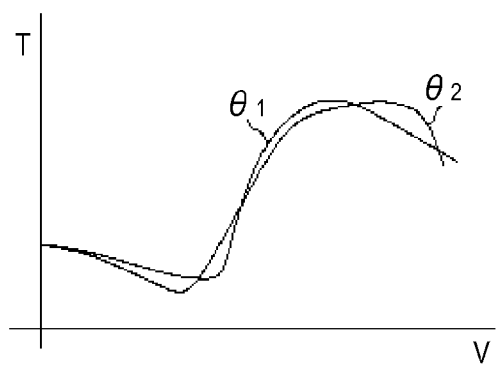
FIG. 3 is a graph showing VT curves of long edges of the slit according to the first embodiment.
Figure 4A:
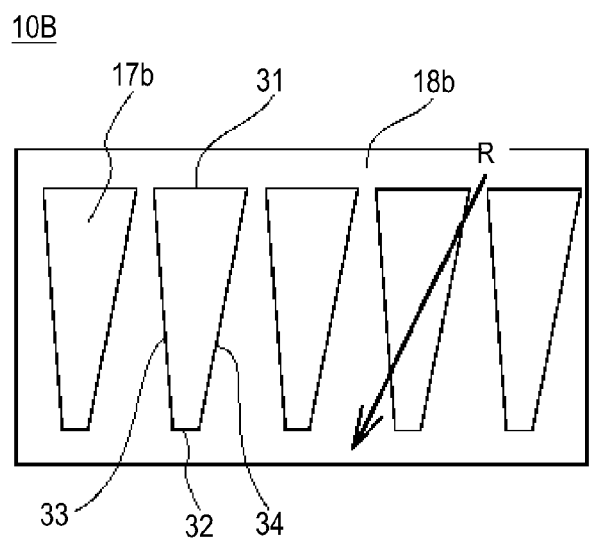
FIG. 4A is a plan view of an upper electrode of one pixel according to a second embodiment and FIG. 4B is an enlarged view for explaining angles made by one slit and the rubbing direction of FIG. 4A.
Figure 4B:
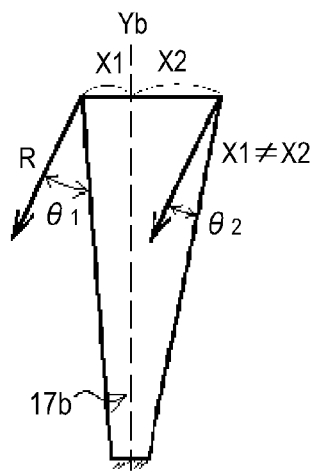
Figure 5A:
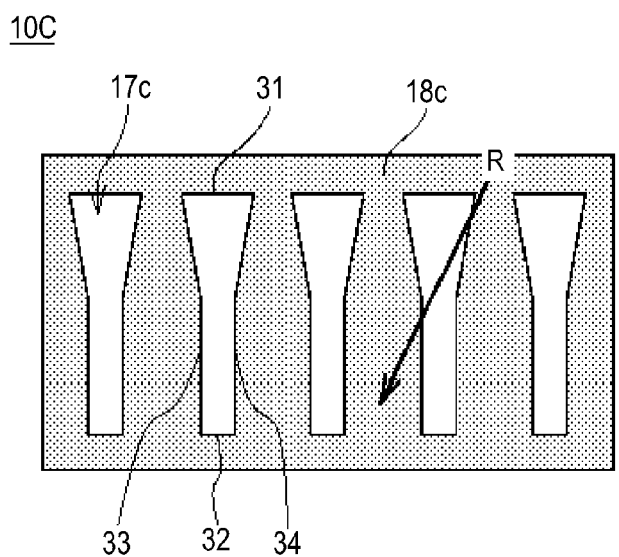
FIG. 5A is a plan view of an upper electrode of one pixel according to a third embodiment and FIG. 5B is an enlarged view for explaining angles made by one slit and the rubbing direction of FIG. 5A.
Figure 5B:
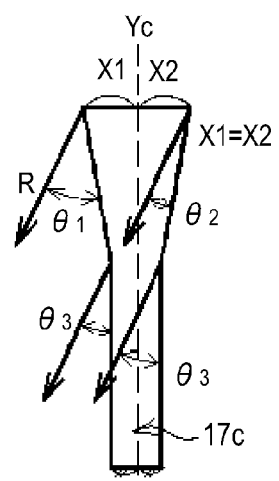
Figure 9:
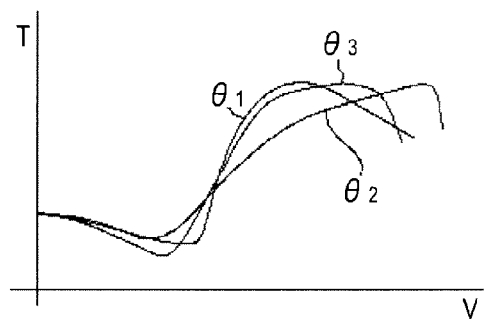
FIG. 9 is a graph showing VT curves of long edges of the slit according to the fifth embodiment.
Figure 10:
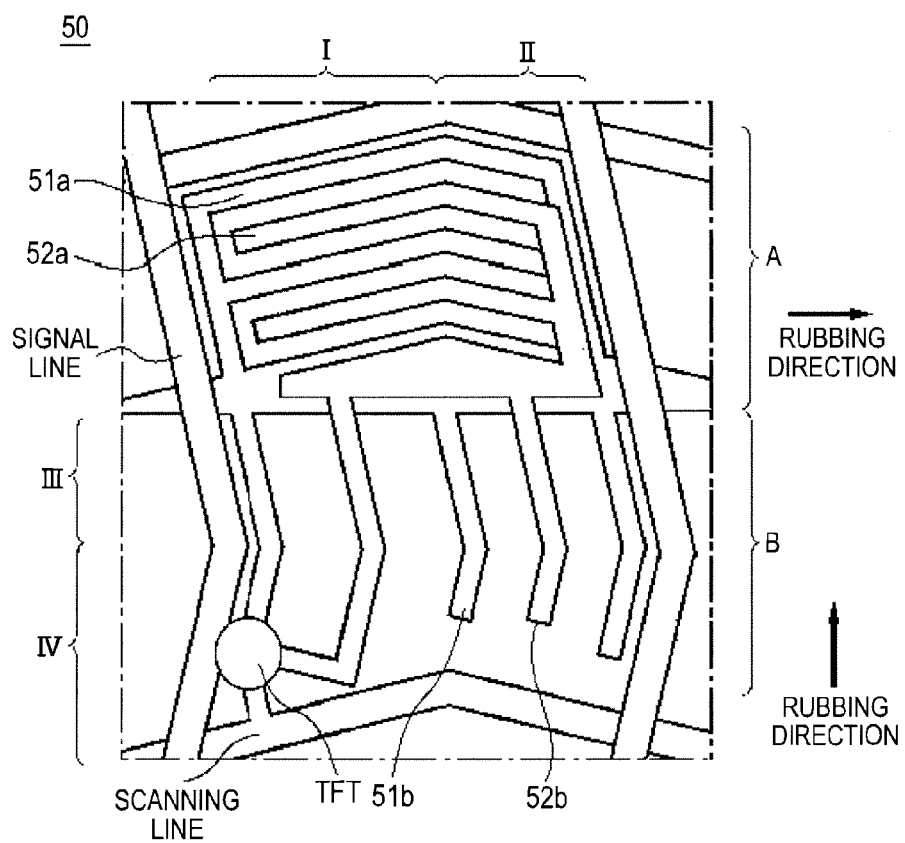
FIG. 10 is a schematic plan view showing arrangement of electrodes and rubbing directions in one sub-pixel of a horizontal-electric field liquid crystal display panel in related art.

FIG. 1 is a schematic cross-sectional view for explaining the operation principle of a liquid crystal display panel according to an embodiment. FIG. 2A is a plan view of an upper electrode of one pixel according to a first embodiment and FIG. 2B is an enlarged view for explaining angles made by one slit and a rubbing direction of FIG. 2A. FIG. 3 is a graph showing VT characteristics of long edges of the slit according to the first embodiment. FIG. 4A is a plan view of an upper electrode of one pixel according to a second embodiment and FIG. 4B is an enlarged view for explaining angles made by one slit and the rubbing direction of FIG. 4A. FIG. 5A is a plan view of an upper electrode of one pixel according to a third embodiment and FIG. 5B is an enlarged view for explaining angles made by one slit and the rubbing direction of FIG. 5A. FIG. 6 is a graph showing VT characteristics of long edges of the slit according to the third embodiment. FIG. 7A is a plan view of an upper electrode of one pixel according to a fourth embodiment and FIG. 7B is an enlarged view for explaining angles made by a pair of slits and the rubbing direction of FIG. 7A. FIG. 8A is a plan view of an upper electrode of one pixel according to a fifth embodiment and FIG. 8B is an enlarged view for explaining angles made by a pair of slits and the rubbing direction of FIG. 8A. FIG. 9 is a graph showing VT characteristics of long edges of the slit according to the fifth embodiment.

First, the operation principle of an FFS-mode liquid crystal display panel common to respective embodiments will be explained with reference to FIG. 1. An FFS-mode liquid crystal display device 10 includes an array substrate AR and a color filter substrate CF. In the array substrate AR, plural scanning lines and common wiring are respectively provided in parallel to a surface of a first transparent substrate 11 and plural signal lines (all lines are not shown) are provided in a direction crossing these scanning lines and the common wiring. A lower electrode 15 made of a transparent material such as ITO, IZO or the like connected to the common wiring so as to cover respective regions sectioned by the scanning lines and the signal lines is provided. Therefore, the lower electrode 15 operates as a common electrode. On a surface of the lower electrode 15, upper electrodes 18 made of a transparent material such as ITO in which plural slits 17 are formed in a stripe shape are provided through an insulating film 16. The surface of the upper electrodes 18 and the plural slits 17 are covered with an alignment layer 20. The upper electrodes 18 are connected to switching elements such as not-shown TFTs (Thin Film Transistors) and operate as pixel electrodes.

The color filter substrate CF has a structure in which a color filter layer 23, an overcoat layer 24 and an alignment film 25 are provided on a surface of a second transparent substrate 22. The array substrate AR is placed so as to face the color filter substrate CF to allow the upper electrodes 18 and the lower electrode 15 of the array substrate AR to face the color filter layer 23 of the color filter substrate CF. Next, liquid crystal LC is sealed between the array substrate AR and the color filter substrate CF as well as polarizing plates 26, 27 are arranged outside both substrates AR, CF respectively to thereby form the FFS-mode liquid crystal display device 10.

In the FFS-mode liquid crystal display device 10, when the electric field is formed between the upper electrode 18 and the lower electrode 15, the electrode field is directed to the lower electrode 15 at both sides of the upper electrodes 18 as shown in FIG. 1. Accordingly, it is possible to drive not only liquid crystal existing in the slit 17 but also liquid crystal existing on the upper electrodes 18. Therefore, the FFS-mode liquid crystal display device 10 has characteristics that it has a wide viewing angle as well as high contrast, further, it can perform bright display because of high transmittance. Additionally, there is an advantage that the FFS-mode liquid crystal display device 10 generates high storage capacitance collaterally because the overlapping area of the upper electrodes 18 and the lower electrode 15 in plan view is large, which eliminates the need for an auxiliary capacitance line separately.

First Embodiment

A structure of an upper electrode 18a of one sub-pixel in the liquid crystal display panel 10A in the first embodiment will be explained with reference to FIGS. 2A and 2B. The upper electrode 18a has a rectangular shape, which is depicted in landscape in FIG. 2A. In the upper electrode 18a, plural slits 17a having the same shape are formed. The slit 17a is substantially longer than is wide, in which opposite short edges are called a first short edge 31, a second short edge 32, and in which a first long edge is called a long edge 33 and a right long edge is called a second long edge 34 in a pair of long edges connecting to the short edges. The first and second long edges 33, 34 of the slit 17a and a rubbing direction R (which is equal to an alignment direction of liquid crystal when the electric field is not applied) cross each other. When an angle made by the left long edge 33 and the rubbing direction R is θ1 and an angle made by the right long edge 34 and the rubbing direction R is θ2 as shown in FIG. 2B, angles made by the first and second long edges 33, 34 of the slit 17a and the rubbing direction R are arranged to be θ1≠θ2. Additionally, the slit 17a is made to be symmetrical with respect to a central axis Ya in a long edge direction. That is, when a perpendicular bisector of the second short edge 32 of the slit 17a is the central axis Ya and lengths of portions of the first short edge 31 positioned at both sides of the central axis Ya are respectively X1 and X2, the relation of X1=X2 is satisfied.

In the FFS-mode liquid crystal display panel, the VT characteristics vary according to the angle made by the long edge of the slit and the rubbing direction, the width of the slit and the distance between adjacent slits. Accordingly, one slit 17a of the upper electrode 18a will have both VT characteristics by the left long edge 33 (displayed as θ1) and VT characteristics by the right long edge 34 (displayed as θ2) as shown in FIG. 3. Accordingly, the liquid crystal display panel 10A according to the first embodiment is observed by an observer as the panel which has VT characteristics represented by an envelope of both VT characteristics as shown in FIG. 3. If a tinge of yellow is added in respective VT characteristics, the color is compensated with one another in respective characteristics such that, when some region has a tinge of yellow, yellow does not appear in other regions of VT characteristics, as a result, coloring phenomenon can be suppressed.

In the above case, the left edge and the right edge of the slit incline to the same side with respect to the rubbing direction to make crossing angles as shown in FIGS. 2A and 2B, however, the left edge and the right edge may incline to the reverse side with respect to the rubbing direction as the embodiment. In that case, a rotating direction of liquid crystal differs in the vicinity of the left edge and in the vicinity of the right edge, therefore, large effect can be obtained on compensation for color variations depending on the viewing angle, in addition to the effect of color compensation by different VT characteristics as in the embodiment. Also in the following embodiments, the same effect can be obtained by setting the rubbing angle in the same manner.

Second Embodiment

A structure of an upper electrode 18b of one sub-pixel in the liquid crystal display panel 10B in the second embodiment will be explained with reference to FIGS. 4A and 4B. In FIGS. 4A and 4B, the same reference numerals and signs are given to the same components as the liquid crystal display panel 10A according to the first embodiment and the detailed explanation thereof is omitted. The upper electrode 18b is the same as in the case of the liquid crystal display panel 10A according to the first embodiment in a point that angles made by the first and second long edges 33, 34 of a slit 17b and the rubbing direction R are arranged to be θ1≠θ2 when the angle made by the left long edge 33 and the rubbing direction R is θ1 and the angle made by the right long edge 34 and the rubbing direction R is θ2 as shown in FIG. 4B. However, the slit 17b of the upper electrode 18b has a different structure from the case of the liquid crystal display panel 10A according to the first embodiment in a point that the slit 17b is formed to be asymmetrical with respect to a central axis Yb in the long edge direction.

That is, when a perpendicular bisector of the second short edge 32 of the slit 17b is the central axis Yb and lengths of portions positioned at both sides of the central axis Yb of the first short edge 31 are respectively X1 and X2, the relation of X1≠X2 is satisfied. According to the structure, respective angles θ1, θ2 made by the long edges 33, 34 at both sides of the slit 17b along the longitudinal direction and the rubbing direction R can be set to be optional plural values, therefore, plural VT characteristics fixed by these angles can be optionally set. The VT characteristics having a similar tendency as the upper electrode 18a in the liquid crystal display panel 10A of the first embodiment can be obtained also by applying the above structure. Accordingly, the same effect as the liquid crystal display panel 10A according to the first embodiment can be obtained also in the liquid crystal display panel 10B according to the second embodiment.

Third Embodiment

A structure of an upper electrode 18c of one sub-pixel in the liquid crystal display panel 10C in the third embodiment will be explained with reference to FIGS. 5A and 5B. In FIGS. 5A and 5B, the same reference numerals and signs are given to the same components as the liquid crystal display panel 10A according to the first embodiment and the detailed explanation thereof is omitted. A slit 17c formed in the upper electrode 18c has a portion in which the long edges 33, 34 of both sides in the longitudinal direction are parallel to each other or a portion in which the long edges 33, 34 extend in different directions, which is formed to be symmetrical with respect to a central axis Yc in the long edge direction. When such structure is applied, respective long edges 33, 34 cross the rubbing direction at three different angles of θ1, θ2 and θ3 as shown in FIG. 5B. As a result, the liquid crystal display panel 10C of the third embodiment is observed by an observer as the panel which has the VT characteristics represented by an envelope of three VT characteristics as shown in FIG. 6. If a tinge of yellow is added in respective VT characteristics, the color is compensated with one another in respective characteristics such that, when some region has a tinge of yellow, yellow does not appear in other regions of VT characteristics, as a result, coloring phenomenon can be more suppressed.

Fourth Embodiment

A structure of an upper electrode 18d of one sub-pixel in the liquid crystal display panel 10D in the fourth embodiment will be explained with reference to FIGS. 7A and 7B. In FIGS. 7A and 7B, the same reference numerals and signs are given to the same components as the liquid crystal display panel 10A according to the first embodiment and the detailed explanation thereof is omitted. The upper electrode 18d includes plural pairs of slits 17d1, 17d2, in which slits in each pair have the same shape and arranged to be inverted with respect to each other. The slit 17d1 as one of the slits has the same shape as the slit 17a of the liquid crystal display panel 10A of the first embodiment, whereas the other slit 17d2 has a structure in which the slit 17d1 is inverted in the vertical direction at a central axis Xd in the direction orthogonal to the longitudinal direction of the slit, for example, in FIG. 7B.

When the above structure is applied, many pairs of slits 17d1, 17d2 having different shapes from each other can be arranged symmetrically with respect to the central axis Xd within one sub-pixel. Additionally, many slits can be arranged within one sub-pixel, and a light emitting state of liquid crystal will be symmetrical with respect to the central axis Xd in the direction orthogonal to the longitudinal direction of the slits 17d1, 17d2. According to the liquid crystal display 10D of the fourth embodiment, viewing-angle characteristics become good as well as the transmittance is improved, thereby realizing the liquid crystal display panel having good display quality and less coloring.

Fifth Embodiment

A structure of an upper electrode 18e of one sub-pixel in the liquid crystal display panel 10E in the fifth embodiment will be explained with reference to FIGS. 8A and 8B. In FIGS. 8A and 8B, the same reference numerals and signs are given to the same components as the liquid crystal display panel 10D according to the fourth embodiment and the detailed explanation thereof is omitted. The upper electrode 18e includes plural pairs of slits 17e1, 17e2, in which slits in each pair have different shapes from each other. The slit 17e1 as one of the slits has the same shape as the slit 17c of the liquid crystal display 10C of the third embodiment, however, the other slit 17e2 is formed so that a left long edge 33' and a right long side 34' are parallel to the right long edge 34 and the left long edge 33 of one slit 17e1 respectively.

In the above structure, the slits have shapes which are commonly called complementary shapes. The slits 17e1, 17e2 are asymmetrical with respect to a central axis Xe in the direction orthogonal to the longitudinal direction of the slits, and many slits 17e1, 17e2 can be arranged in each one sub-pixel. Moreover, the slits can cross the rubbing direction with at least three angles of θ1 to θ3 in each pair of slits as shown in FIG. 8B. As a result, the liquid crystal display panel 10E will have three VT characteristics of θ1 to θ3 as shown in FIG. 9, which is observed by an observer as the penal which has the VT characteristics represented by an envelope of three VT characteristics. For example, when the long edges 33, 34 and the long edges 33', 34' forming the slits 17e1, 17e2 are not formed to be parallel in the same slit respectively, angles made by the long edges 33, 34 as well as the long edges 33', 34' and the rubbing direction R will have four VT characteristics of θ1 to θ4. If a tinge of yellow is added in respective VT characteristics, the color is compensated with one another in respective characteristics such that, when some region has a tinge of yellow, yellow does not appear in other regions of VT characteristics, as a result, coloring phenomenon can be more suppressed.

The slits according to the embodiments have shapes in which widths of both ends of slits are different. When applying the structure, the VT characteristics vary according to the width difference, therefore, plural VT characteristics can be obtained not only by angles made by the rubbing angle but also by the slit width, which enables compensation of the reduction of coloring with each other and suppression of the coloring phenomenon. As a result, the high-quality liquid crystal display panel can be provided.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A liquid crystal display panel comprising:
a pair of substrates arranged face to face so as to sandwich a liquid crystal layer;
a lower electrode formed on a lower substrate;
an upper electrode formed on a surface of the lower substrate through an insulating layer, in which plural slits are formed in each sub-pixel, wherein each of the plural slits is formed as an aperture in which both ends thereof in the longitudinal direction are closed; and
an alignment film formed so as to cover a surface of the upper electrode and the insulating layer,
wherein the plural slits have different widths at both ends of slits in a longitudinal direction,
wherein a rubbing direction of the alignment film is in a direction crossing all edges corresponding to the longitudinal direction of the slits,
wherein each of the plurality of slits has a first long edge and a second long edge, and
wherein an angle between the first long edge and the rubbing direction is different than an angle between the second long edge and the rubbing direction.

2. The liquid crystal display panel according to claim 1, wherein each of the plural slits is made to be symmetrical with respect to a central axis in a long edge direction.

3. The liquid crystal display panel according to claim 1, wherein edges of the slit along the longitudinal direction are formed to be asymmetrical with respect to an axis corresponding to the longitudinal direction of the slit.

4. The liquid crystal display panel according to claim 1, wherein the slit has a folding portion at which edges of the slit along the longitudinal direction of the slit are folded in a direction in which the edges are apart from each other.

5. The liquid crystal display panel according to claim 1, wherein plural pairs of slits are included, in which slits in each pair have different shapes respectively.

6. The liquid crystal display panel according to claim 5, wherein the slits in each pair having the same shape are arranged to be inverted with respect to each other at a central axis in the direction orthogonal to the longitudinal direction of the slits.

7. The liquid crystal display panel according to claim 6, wherein the slits in each pair are formed so that edges of adjacent slits along the longitudinal direction are parallel to each other.

8. The liquid crystal display panel according to claim 5, wherein the slits in each pair having different shapes are arranged to be inverted with respect to each other at a central axis in the direction orthogonal to the longitudinal direction of slits.

9. The liquid crystal display panel according to claim 8, wherein the slits in each pair are formed so that edges of adjacent slits along the longitudinal direction are parallel to each other.

10. The liquid crystal display panel according to claim 5, wherein the slits in each pair are formed so that edges of adjacent slits along the longitudinal direction are parallel to each other.

* * * * *